United States Patent [19]
Higuchi et al.

[11] 3,711,147
[45] Jan. 16, 1973

[54] DRAIN APPARATUS FOR THE BODY OF A CAR

[75] Inventors: Shizuo Higuchi, Itabashi-ku, Tokyo; Michiyoshi Hagino, Kitaadachi-gun, Saitama-ken, both of Japan

[73] Assignee: Honda Giken Kogyo Kabushiki Kaisha

[22] Filed: Feb. 22, 1971

[21] Appl. No.: 117,523

[30] Foreign Application Priority Data

Feb. 23, 1970 Japan.............................45/14838

[52] U.S. Cl. .............................296/28 R, 296/137 R
[51] Int. Cl. ..............................................B62d 25/06
[58] Field of Search..............296/137 R, 137 E, 28 R

[56] References Cited

UNITED STATES PATENTS

| 3,326,599 | 6/1967 | Pashenee | 296/28 R |
| 2,122,712 | 7/1938 | Bishop | 296/137 E |
| 3,084,972 | 4/1963 | Gibson et al. | 296/28 R |
| 2,991,120 | 7/1961 | Barenyi | 296/137 R |
| 3,044,824 | 7/1962 | Werner | 296/137 E |
| 3,078,122 | 2/1963 | Werner | 296/137 E |

Primary Examiner—Leo Friaglia
Assistant Examiner—John A. Pekar
Attorney—Waters, Roditi, Schwartz & Nissen

[57] ABSTRACT

A car body of a motorcar comprises a roof formed by a central main panel and a pair of left and right auxiliary panels welded to the main panel along the opposite side edges thereof. A pair of left and right troughs are provided below the roof extending longitudinally along the inside edges of the left and right welded portions, respectively, and each of these troughs is in communication, at least at one of the ends thereof with the interior of a hollow window frame formed along a corresponding end edge of the roof. The hollow window frame opens into a pair of left and right pillars extending downwards from the opposite ends of the window frame and the pillars in turn open into side beams with apertures wherefrom water can be discharged which is collected in the trough.

9 Claims, 6 Drawing Figures

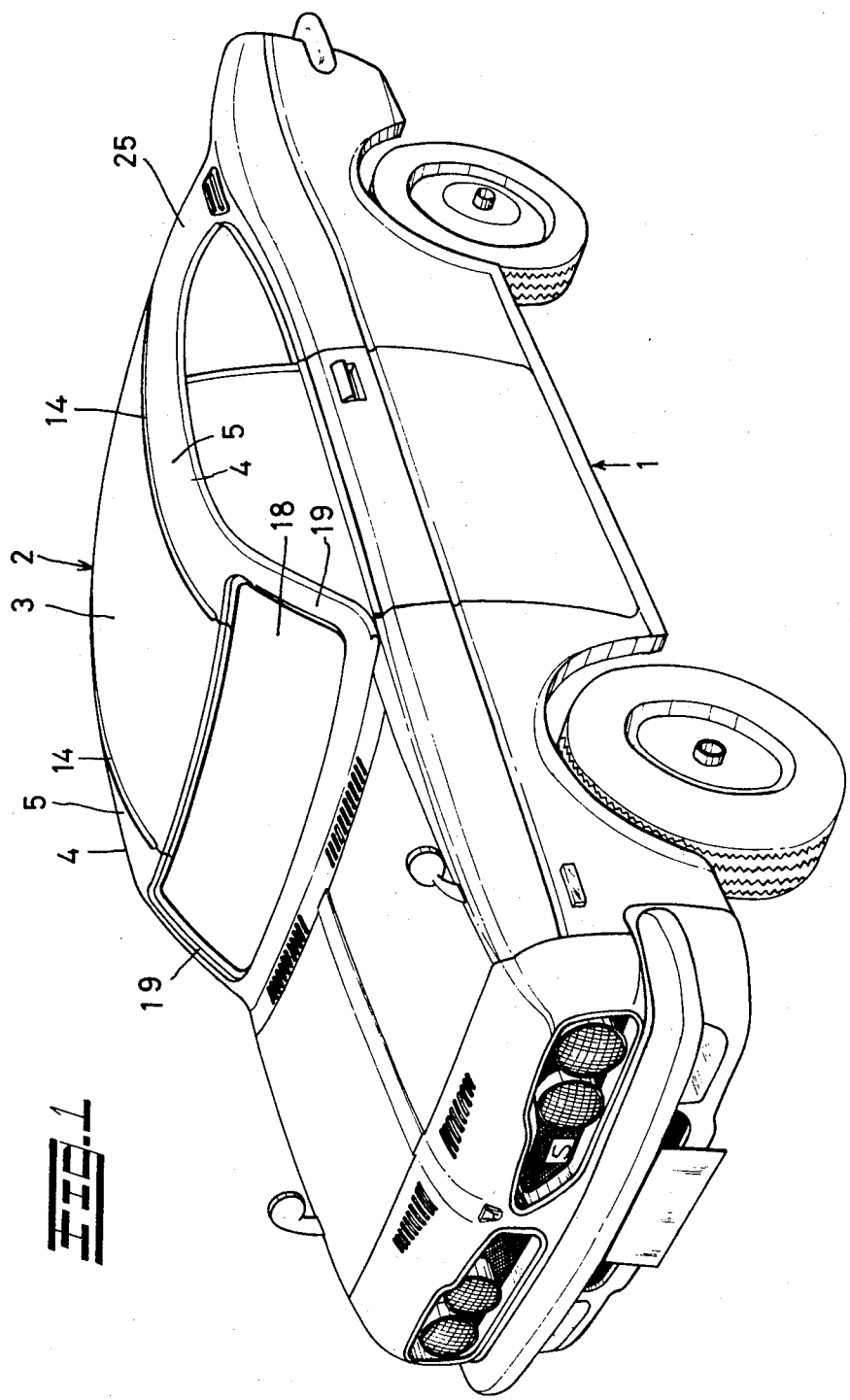

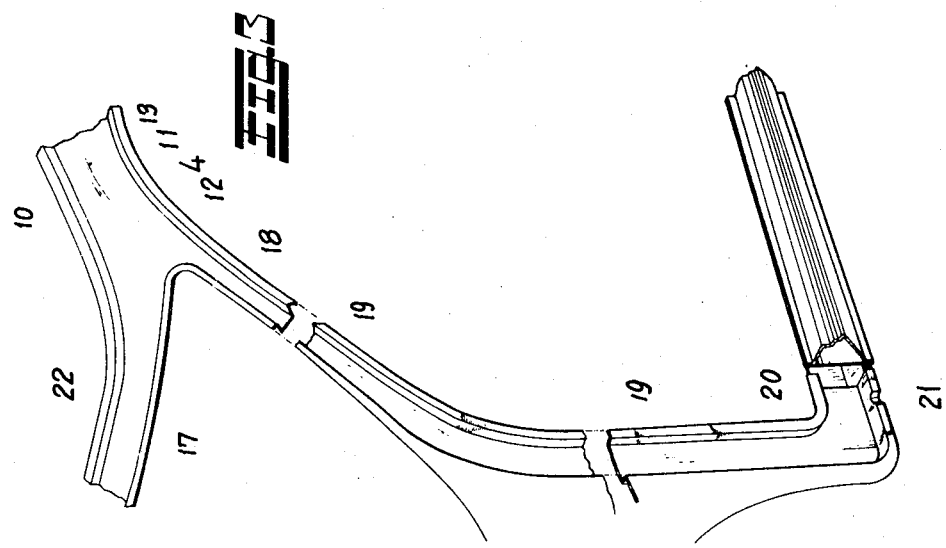
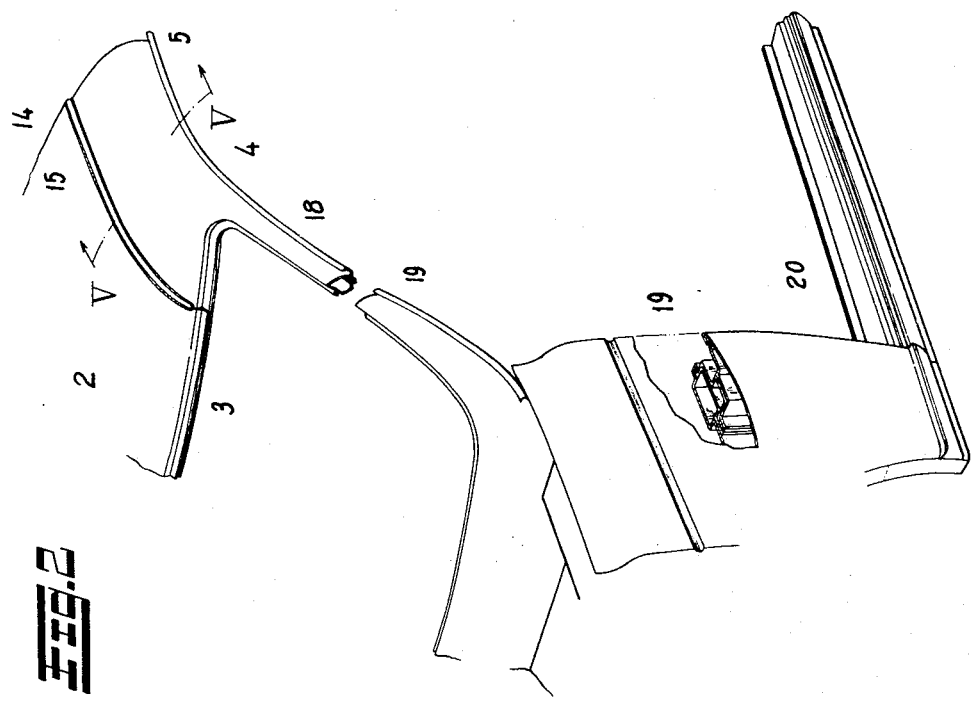

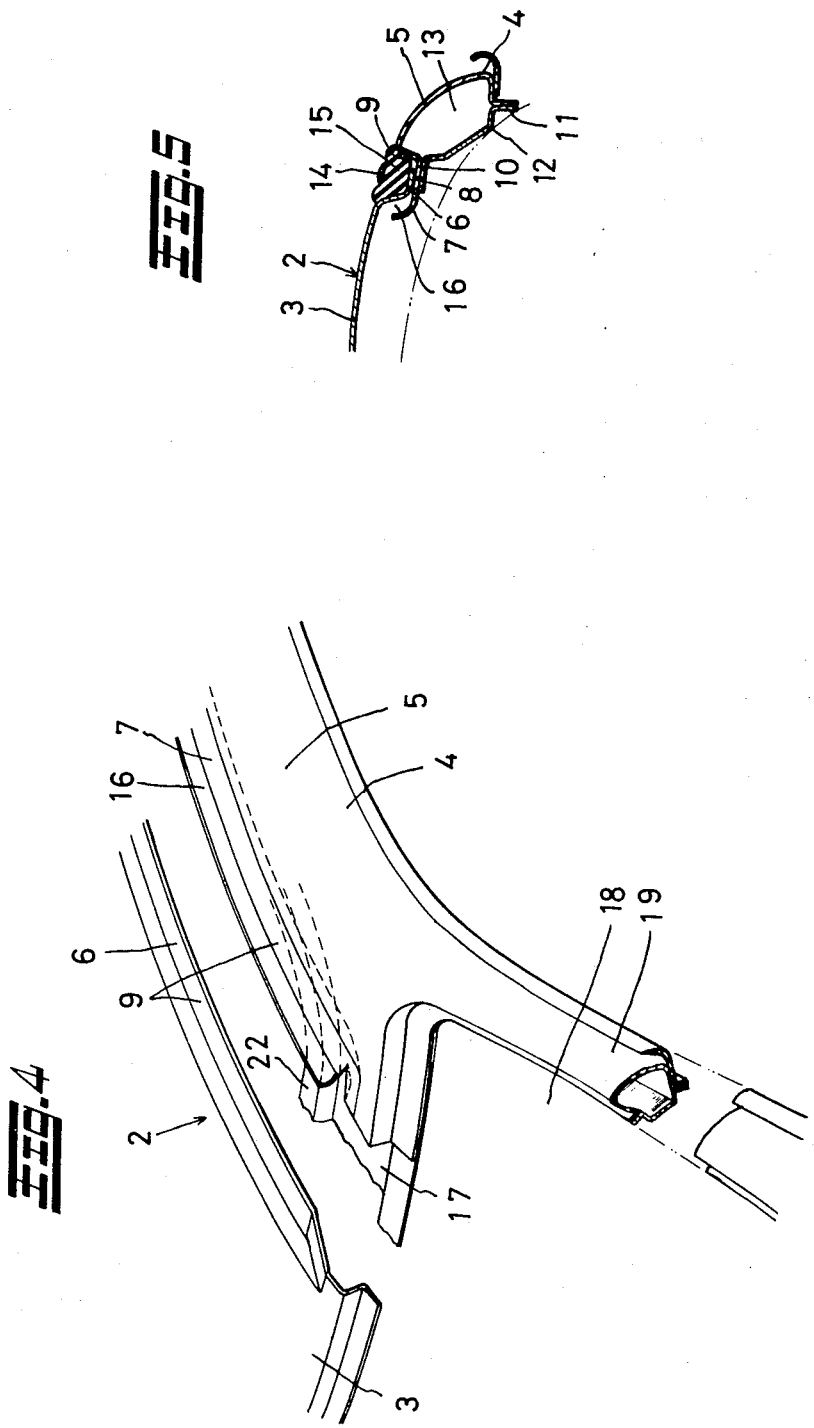

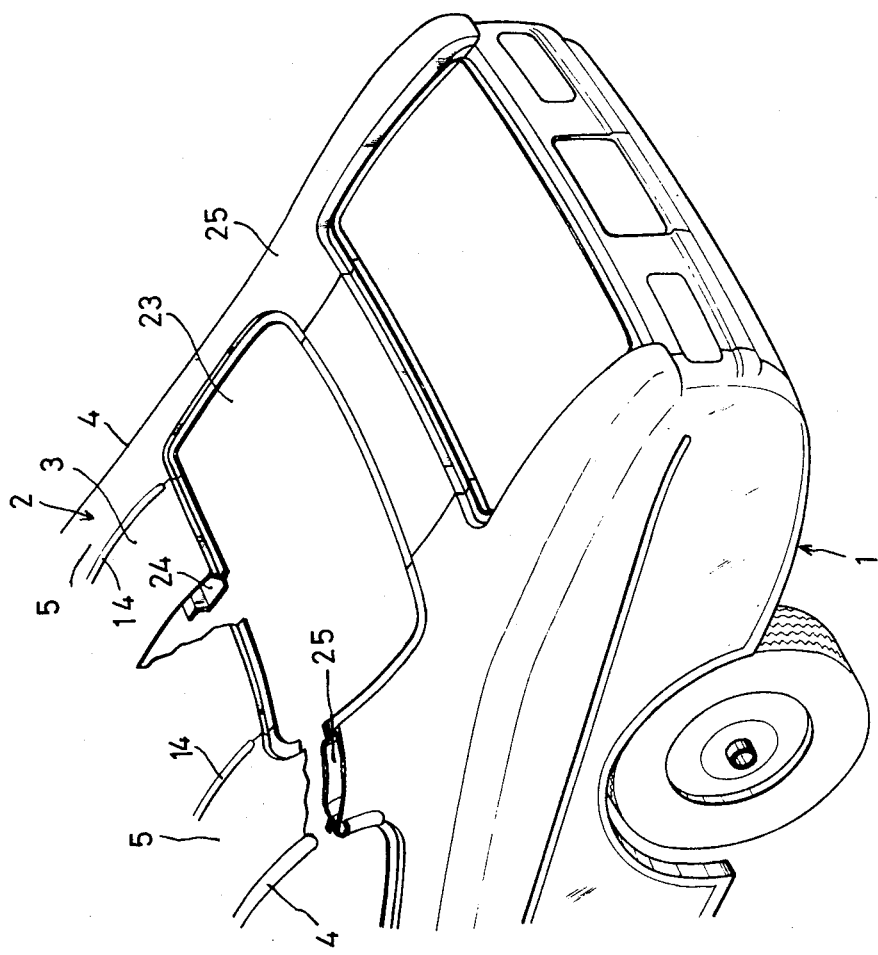

DRAIN APPARATUS FOR THE BODY OF A CAR

BRIEF SUMMARY OF THE INVENTION

The invention relates to the roof construction of a motor car.

It has been proposed to construct the roof of the body of a motorcar of a central main roof panel and a pair of left and right auxiliary roof panels welded to the main roof panel along the opposite side edges thereof. A roof of this construction has been found to be deficient in that a gap is formed in each welded portion of the roof and rain water can penetrate through the gap into the body and spoil the roof lining.

An object of the invention is to provide a construction free from such disadvantage.

According to the invention a roof of a car body comprises a central main roof panel and a pair of left and right auxiliary roof panels welded to the main roof panel along the opposite side edges thereof, and a pair of left and right longitudinal troughs are mounted below the roof to extend along the inside edges of the left and right welded portions, respectively, each of these troughs being in communication, at least at one end terminal, with downward drain openings by means of a lateral opening formed along the corresponding end edge of the roof and a pair of left and right pillars extending downwardly from the opposite ends of the window frame.

BRIEF DESCRIPTION OF THE DRAWING

FIG. 1 is a perspective view of a car body of a motorcar provided with the apparatus according to this invention, FIGS. 2 and 3 are enlarged perspective views, partly in section, of portions thereof, FIG. 4 is an exploded perspective view of a portion thereof, FIG. 5 is a sectional view taken along line V—V in FIG. 2, and FIG. 6 is a perspective view, partly in section, of the car body viewed from behind.

DETAILED DESCRIPTION

Referring to the drawing, numeral 1 denotes a car body and numeral 2 denotes a roof thereof. The roof 2 is composed of a central main roof panel 3 and a pair of left and right auxiliary roof panels 5 extending integrally with and bent inwards from a pair of left and right side panels 4. The main roof panel 3 and each auxiliary roof panel 5 are juxtaposed as seen in FIG. 5 and welded together at 8, along legs 6 and 7 so as to form above portion 8 a channel-shaped groove 9. Each roof panel 5 is provided at the inner surface thereof with a roof rail 12 welded thereto at its upper and lower side edges 10 and 11 so as to form a longitudinal hollow beam 13. A strip member 15 of rubber, or the like, having a bead 14 on its upper surface is mounted in each groove 9 and is secured thereto by an adhesive or the like.

In a roof of this construction, there may exist gaps in each welded portion 8 through which rain water can penetrate into the passenger compartment and damage the roof lining.

The invention seeks to avoid the problem with this penetrating rain water. Specifically, adjacent each welded portion 8 is formed on the inside thereof a trough 16 extending along the weld so that any penetrated rain water may be conveyed therethrough. The trough 16 is formed by bending the extremity of leg 7. The front end of the trough 16 opens into the interior of a lateral channel of a hollow window frame 17 at the front end edge of the roof 2 along the upper edge of a front windshield 18 of the car body 1. The hollow interior of the window frame 17 is in communication with the interior of side beams 20 via a pair of left and right front hollow pillars 19 extending downwards along both side edges of the front window 18 at the opposite ends of the window frame 17 and which constitute posts for the frame. Each side beam 20 is provided with at least one drain opening 21 in the lower surface thereof, so that water led from the trough 16 is discharged to the exterior through the drain openings 21 of the side beams 20. Numeral 22 denotes a roof rail defining the inside surface of the hollow window frame 17.

The rear ends of the troughs 16 are arranged in a manner similar to that of the front ends. Namely, the rear end of each trough 16 opens into the interior of a hollow window frame 24 formed along the upper edge of the rear window 23 of the body 1 and the interior of the window frame 24 is in communication with the interiors of the side beams 20 through a pair of left and right pillars 25 extending downwardly from the opposite ends of the window frame 24, the details not being illustrated.

The construction is such, according to this invention, that rain water penetrating through each welded portion of the roof is led in longitudinal direction through the trough 16 extending along the inside edge of the welded portion, and thereafter the water flows at an end of the trough into a corresponding hollow window frame and then is discharged through the pillars into the side beams and then to the exterior through the drain openings in the side beams. Thus the penetrated rain water is conveyed away and prevented from entering the interior of the car and spoiling the roof lining.

What is claimed is:

1. Drain apparatus for the body of a car comprising a fixed roof including a central main panel with an outer surface and longitudinal side edges, and auxiliary side panels adjacent the main panel along the side edges thereof, the edges of said main and auxiliary side panels respectively being horizontally superimposed on one another and welded together to form a welded joint thereat, one of said superimposed edges of the panels extending laterally from the associated welded joint and defining an adjacent integral horizontal trough beneath the surface of the roof, a hollow window frame, at least at one of the ends of said trough being in communication with the hollow window frame to permit passage of water from the trough to said window frame, and means communicating with the hollow window frame for conveying the water therefrom for discharge externally of the body.

2. Drain apparatus as claimed in claim 1 wherein a hollow window frame is provided at each end of the trough means.

3. Drain apparatus as claimed in claim 1 wherein said means for conveying the water from the window frame comprises a pair of hollow pillars at each side of the body.

4. Drain apparatus as claimed in claim 3 wherein the means for discharge of the water comprises hollow side beams communicating with the pillars for receiving water therefrom, said side beams having apertures for ultimate discharge of the water.

5. Drain apparatus as claimed in claim 4 wherein said side beams are at the bottom of the car body.

6. Drain apparatus as claimed in claim 3 wherein said hollow pillars constitute posts for the window frame.

7. Drain apparatus as claimed in claim 1 wherein said trough extends along each of said side edges of the main panel at the inner sides of the auxiliary panels.

8. Drain apparatus as claimed in claim 1 wherein the edges of the main panel overlap the respective edges of the auxiliary side panels, said one edge which extends laterally from the associated welded joint being a bent extremity of the auxiliary side panel.

9. Drain apparatus as claimed in claim 8 comprising seal means interfitted between the edges of the main and side panels above the welded joints.

* * * * *